Sept. 18, 1956 J. H. COUNTRYMAN 2,763,406
VALVE CONSTRUCTION FOR DISPENSING CONTAINERS
Filed June 5, 1952 2 Sheets-Sheet 1
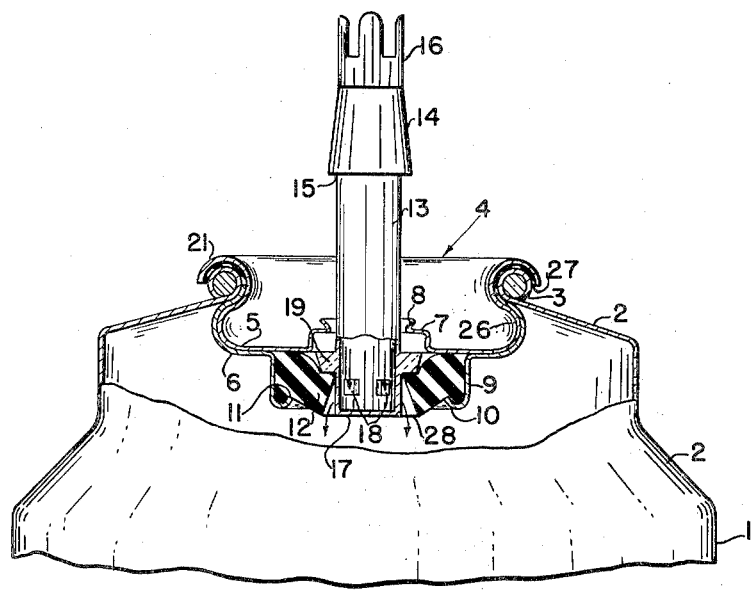
FIG-1
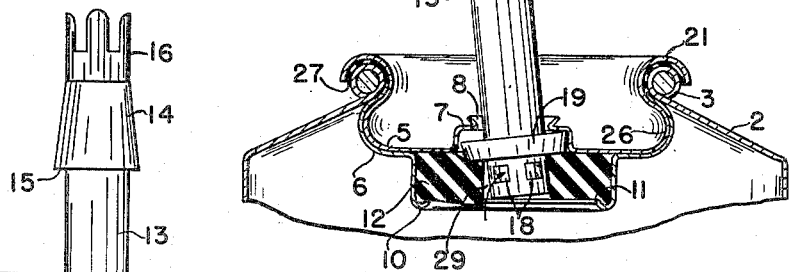
FIG-2
FIG-3
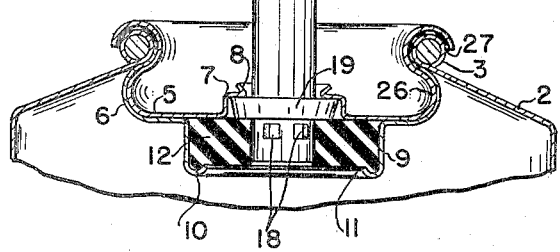
INVENTOR
JAMES H. COUNTRYMAN
BY *Toulmin & Toulmin*
ATTORNEYS Sept. 18, 1956   J. H. COUNTRYMAN   2,763,406
VALVE CONSTRUCTION FOR DISPENSING CONTAINERS
Filed June 5, 1952   2 Sheets-Sheet 2
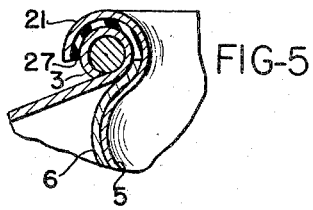
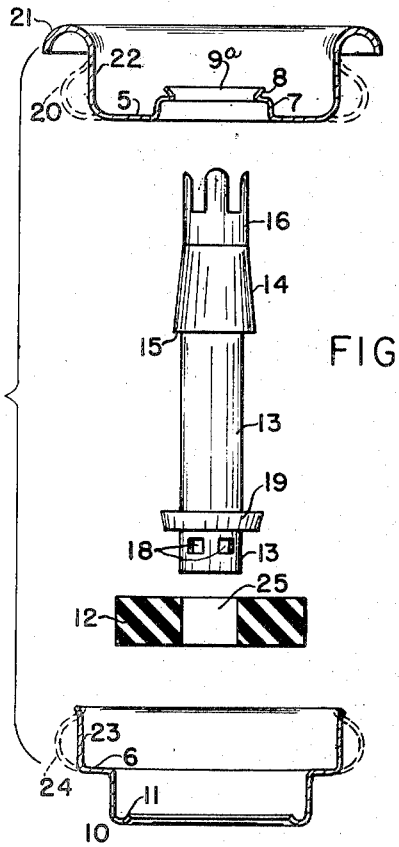
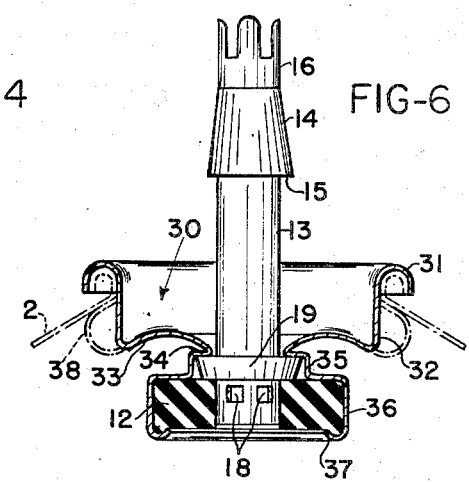
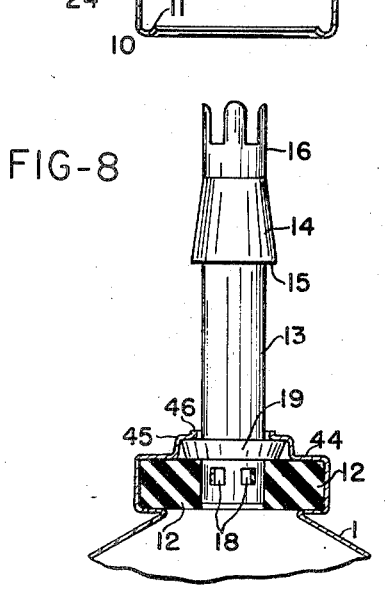
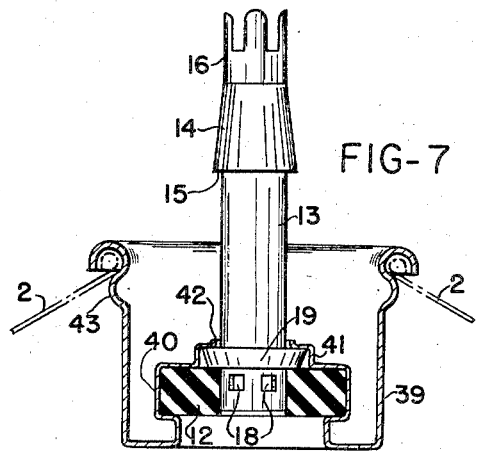
INVENTOR
JAMES H. COUNTRYMAN
BY Toulmin & Toulmin
ATTORNEYS

United States Patent Office 2,763,406
Patented Sept. 18, 1956

2,763,406
VALVE CONSTRUCTION FOR DISPENSING CONTAINERS

James H. Countryman, Dayton, Ohio

Application June 5, 1952, Serial No. 291,922

4 Claims. (Cl. 222—394)

The present invention relates to whipped cream dispensers and more particularly to valves for sealing the containers with gas and for releasing the combined cream and gas.

Valves of this type must be made not only extremely effective in permitting a controlled two-way movement of gas without leak, but must be quite inexpensive to manufacture because the valve is discarded with the empty container. When it is realized that a household size can of whipped cream or shaving cream sells for only a nominal price, the manufacturer obviously cannot afford to invest more than a few cents in the valve accessory.

The valves on the market for this purpose are still too expensive, considering the particular function that they serve. They usually involve compression springs, also special and expensive forms of molded sealing washers. These items, while not very expensive in themselves, nevertheless when made and provided in quantity production, add greatly to the expense of the large number of valves that are required by the extensive market on whipped cream dispensers.

The primary object of the invention is to reduce the number of parts of the valve used in whipped or shaving cream dispensers to an absolute minimum and to use parts of the utmost simplicity from the manufacturing and cost standpoints.

Another object is to provide an improved valve for combined gas and semi-solid dispensers and which require no springs or specially designed washers.

Still another object is to provide an improved valve for handling gas in expendable containers and which not only lends itself to quantity production and assembly, but also offers the maximum facility in permitting gas charging and gas discharging of the container.

Another object is to provide an improved valve for handling gas in relatively inexpensive and expendable containers and which eliminates the necessity for compression springs and molded washers of special and expensive design.

Still another object is to provide an improved valve usable in whipped cream dispensers for admitting gas under pressure and for allowing the release of the gas and a controllable amount of the semi-solid content of the dispenser, which valve will utilize some of the standard parts of the valves on the market but will eliminate all the expensive and hard to assemble parts of those valves.

Other objects and features will be apparent as the specification is perused in connection with the accompanying drawings in which:

Figure 1 shows a fragmentary view, partly in section, of the upper portion of a dispenser equipped with one form of my improved valve; this figure indicates the position of the various valve parts during the gassing period;

Figure 2 is a view similar to Figure 1 but showing the positions assumed by the parts after the container has been charged with gas;

Figure 3 depicts the relation between the valve parts when the valve is opened to release the gas and semi-solid content of the container;

Figure 4 represents an exploded view of the parts of the valve shown in Figures 1 to 3 but before these parts have been formed to shape;

Figure 5 is a fragmentary sectional view of the formed joint between the container and the two metal portions of the valve proper; and Figures 6, 7 and 8 show modified forms of the valve, depending on the character and shape of the dispensing container.

Referring to Figure 1, reference character 1 designates a cylindrical container of sheet metal and drawn to shape. The container is closed at the bottom and is tapered through two steps indicated at 2 to a smaller open rolled end 3. The present improvement concerns a combined cover member and valve indicated generally at 4 for controlling the ingress of gas to and the egress of gas from the container.

It will be understood that containers of this character are usually employed as dispensers of semi-liquid food or confections such as whipped cream which is propelled through a valve in the top cover under the action of a gas. The container may also be used to dispense shaving cream. The gas, of any suitable and non-poisonous character, is introduced through a tube which forms part of the valve and the latter is caused to open to receive the gas or to release the gaseous mixture within the container by manipulating the tube.

Valves of this general character are well known but they are open to the objection of using springs and complicated structures which involve not only unjustifiable expense, considering the fact that the valve is discarded with the empty container, but also may involve erratic performance.

The improved valve 4 eliminates the need for these springs and other complicated structure and comprises in general two thin metal sheets 5, 6 which are in abutting relation over their outer areas and the upper metal sheet is formed around the circular edge 3 of the tapered container portion 2 of smaller size. In order to insure a hermetic joint at the rolled edge of the can, the metal member 5 may be coated on the inside surface in the region of that edge and with a thin rubbery sealing compound of any suitable and well known character.

The upper metal member 5 is provided at the center with an elevated portion 7 which terminates at the center in a tapered collar 8 flaring outwardly as indicated in Fig. 1. The purpose of the elevated portion 7 will be explained hereinafter.

The lower metal member 6 is provided with a depending portion 9 at the center which has an inwardly curved edge 10 at the bottom, this curve being slightly upward as indicated at 11. Within the space or chamber between the metal members 5, 6 there is a washer 12 made of any kind of rubber, but preferably an artificial composition such as neoprene. The curved edge 10 and the lip 11 of the metal portion 9 is caused to press upwardly into the rubber washer and in that way secure the outer portions of the washer with respect to the metal member.

Extending downwardly through the upper and lower metal members and located at the center of the container there is a tubing 13 made preferably of plastic bone material. This tubing serves for the introduction of gas and for the egress of gaseous mixture from the interior of the container, as will be described hereinafter. The tubing has a tapered portion 14 which leaves a shoulder 15, the tapered portion terminating in a pronged extension 16. The interior of the tubing is hollow but the lower end is closed as indicated at 17.

There are four or more peripheral openings 18, shown as of rectangular shape, leading from the interior to the exterior of the tube, these openings being positioned lengthwise of the tube at positions contained within the thickness of the rubber washer.

Just above these openings there is a collar 19 integral with the tube, tapered at its periphery and located within the elevated portion 7 of the member 5, as can be readily seen in Fig. 2. The opening in the outwardly flared collar 8 of the upper metal member 5 is considerably larger than the diameter of the tube 13. But the opening in the washer 12 is slightly smaller than the diametral size of the tube so that the latter can be pushed into the washer and tightly held therein. The openings 18 are therefore blocked or cut off by the interior peripheral surface of the rubber washer 12 as seen in Fig. 2.

Prior to assembly, the metal part 5 has a shape similar to that shown in cross-section in Fig. 4. The dot-dash lines 20 in this figure indicate the shape that the part takes after it has been formed when assembled and sealed onto the container. Thus Fig. 4 includes the outwardly extending curved flange 21, the straight cylindrical portion 22 and the upstanding collar portions, 7, 8, together with an opening 9a, which as explained hereinbefore, is substantially larger than the diametral size of the tube 13.

The lower member 6 as shown in Fig. 4 before assembly also has a straight cylindrical portion 23 which is later pressed outwardly to a semi-circular form 24 after the cover and valve have been sealed into the container. The fact that the opening 25 in the washer 12 is considerably smaller than the end of the tube 13 is shown in Fig. 4. When the tube 13 is pushed into the opening 25, the top metal member 5 is then placed over the tubing and the recess or chamber in the elevated portion 7 receives the collar or shoulder member 19. The lower metal member 6 is then assembled with the washer 12 and the assembled parts are introduced into the large opening in the container 1.

The edge 21 of the upper member 5 is then formed around the rolled collar 3 of the container in any suitable and well known manner, and simultaneously therewith a forming tool is introduced into the interior of the member 5 at a position indicated at 26 in Fig. 2 to produce semicircular bulges in the straight cylindrical portions of the upper and lower members 5, 6 as indicated by the dot-dash lines in Fig. 4. This bulge, particularly that on the upper member, provides a large area contact between the outer diametral surface and the rolled edge of the container, as can be seen in Fig. 2.

This large contact area serves to provide a more effective hermetic seal or joint at this position. The contacting surfaces of the elements 5, 6, or either one of them, at the point where the rolled joint is made, may if desired, be coated with a rubbery compound as indicated at 27, in order to increase the sealing effect at the joint.

*Operation of the valve*

The container 1 is first filled with the whipped cream or other material to be dispensed under gas pressure, the filling operation taking place before the covers 5, 6 are rolled into positon. The composite cover is then applied to the upper end of the container to close off the large opening therein, in the manner described hereinbefore.

The next step in operation is to introduce the gas and this is done by a device that pushes the tube 13 downwardly into the container, causing the collar or shoulder 19 to enter the rubber washer at its inner periphery and thus cause the opening in the washer to distort in a concentric manner to a shape indicated in Fig. 1. Thus the lower peripheral edge of the washer indicated at 28 is forced outwardly about the tube, leaving an annular conical opening between the tube and opening in the washer.

This opening communicates with the apertures 18 in the tube so that gas can be introduced at the point 16 and this gas leaves the tube at the openings 18, flowing through the annular opening between the tube and the washer into the container.

It will be understood that dispensers of this type are handled on a large quantity basis, both in manufacture and also during the attachment of the valve structure. Hundreds of dispensers are filled with gas at one time so that apertured plates can be used to fit over the tapered portions 14 and to press the same downwardly while gas is being introduced on a group basis through the tube into the container.

After the gassing has been completed, the pressure on the tube 13 is released and the extensibility of the rubber causes the washer to press the collar 19 upwardly into the compartment formed by the elevated portion 7 and the rubber becomes undistorted at its inner periphery as shown in Fig. 2, so that the openings 18 are effectively sealed off. Thus the gas remains under pressure within the container.

In order to remove the whipped cream or other semi-liquid food which has been gasified within the container, it is simply necessary to move the tube 13 to one side or the other which will again cause the shoulder 19 to move downwardly, but this time on a tilt basis, and this causes the washer to distort at a position directly under the lower portion of the shoulder 19 and again allow communication through an opening 29 into the openings 18 of the tube. The gasified cream thereupon is caused to be forced out of the container and to be propelled up through the interior of the tube 13. When the tube 13 is again moved to its center position the shoulder 19 will resume its horizontal position within the chamber formed by the elevated portion 7 and the openings 18 are again effectively sealed off ready for the next application of the whipped cream for decorative or other purposes.

It is apparent that the members 5, 6, particularly when in the form shown in Fig. 4, can be readily stamped while the washer 12 can be provided on a quantity production basis by employing extruded rubber tubing of the right diametral size and then shearing to proper thickness.

In Fig. 6, instead of employing the metal element 6 as a closure member, I find that on occasion a single metal element 30 may be employed to advantage. This member has a curved terminating flange 31 and a straight cylindrical portion 32, the flange member being adapted to be formed over the rolled edge of the container 1 to effect a seal.

The rubber composition can be applied either to the interior surface of the flange 31 or to the exterior surface of the rolled edge. The member 30 is provided with a reentrant curvilinear portion 33 which narrows down to a neck 34 formed during the shaping of the member and then extends outwardly to constitute a compartment 35 for receiving the shoulder 19 of the tube 13 after the container has been gassed. The cover is then given a larger diametral size as indicated at 36 tightly to hold the washer 12 and, as in the case of the other figures, the portion 36 terminates in an inwardly upturned curvilinear edge 37.

It will be understood that all the metal parts of the valve 30 extend downwardly and into the container 1 except for the edge 31 which is rolled and thus sealed to the rolled edge of the container. The opening in the washer 12 is somewhat smaller than the diameter of the tube 13 so that when the washer is pressed into position past the edge 37 into the compartment formed by the portion 36, the tube 13 will be held tightly within the opening in the washer. The curved edge 37 will press upwardly into the washer and hold it securely in place.

The operation of the modification shown in Fig. 6 is the same as that explained in connection with Figs. 1, 2 and 3 in that a pressure downwardly on the tube 13 will cause the lower portions of the inner periphery of the washer 12 to stretch outwardly and thereby allow communication between the openings 18 and the interior of the container. This action is shown in Fig. 1. A push to one side or the other on the tube 13 will also put the openings 18, and therefore the interior of the tube 13, into communication with the interior of the container, as was explained in connection with Fig. 3.

It is obvious that if desired the straight cylindrical portion of the cover as indicated at 32 can be formed to a semi-circular formation, indicated at 38, after the cover has been secured to the container 1 and thus provide for greater contacting surface between the cover and the rolled edge of the container.

Fig. 7 shows still another form that my improved combined valve and cover may take. The cover member 39 is relatively deep-drawn and there is formed an outwardly extending portion 40 of a width as snugly to receive the washer 12, this portion terminating in a compartment 41 of smaller diameter than the portion 40 in order to receive the shoulder 19 of the tube 13. The opening in the washer 12 is again somewhat smaller than the lower portion of the tube 13 and enough clearance as indicated at 42 is allowed as to permit the tube to be moved to one side or the other and thus distort the washer at the lower inside edge to put the interior of the tube into communication with the interior of the container.

The cover is formed during or after the rolling operation to provide an outwardly extending bulge 43 to provide a greater sealing surface at the rolled edge with the container. If desired, rubber composition or other sealing compound can be applied to the abutting surfaces at the rolled edge.

In Fig. 8 the cover is formed integral with the container. The cover is provided with an upstanding outwardly extending cylindrical portion 44 so as to form a compartment for receiving a circular disc 12 of rubber. The portion 44 terminates in an upwardly and inwardly extending flange member 45 which forms a compartment for the shoulder 19 of the tube 13. This flange member is provided with a lip 46 which is spaced away from the tube 13 so as to permit the latter to be pushed to the right or left in order to open the valve, as was explained in connection with Fig. 3.

It is apparent that the members 44, 45 and 46 as shown in Fig. 8 can also be drawn to shape as can the other valve parts described in connection with the foregoing figures. It is further evident that when the tube 13 remains right in the center of the container, i. e. that it is tipped neither right nor left, and is not pressed downwardly, the interior perimeter of the washer constitutes a sealing wall for the openings 18 and the shoulder 19 is caused to remain in its compartment 45. However, when this tube is tilted right or left, as indicated in Fig. 2, or pressed downwardly as indicated in Fig. 1, the openings 18 come into communication with the interior of the container 1.

From the foregoing, it is evident that I have disclosed a valve that is particularly suitable for dispensing containers and one in which no springs are required because the rubber washer 12 having a central hole of much smaller diameter than the tube 13 causes the tube to move to its normal central position upon release of pressure and thereby to complete the sealing operation. The washer is of the most economical type to manufacture in that it can be formed by merely slicing extruded rubber rolls to the proper thickness and no individual and expensive molding of the washer is necessary.

On the basis of quantity production and keeping in mind the fact that the valve is disposable with the container, my improved valve offers many advantages by reason of simplicity of structure, less expensive parts and easier assemblage of parts than the valves heretofore used in connection with shaving cream dispensers or semi-solid food dispensers.

It will be understood that various modifications and arrangements in structure could be made without departing from the spirit of my invention, and, accordingly, I desire to comprehend such modifications and substitutions of equivalents as may be considered to come within the scope of the appended claims.

Having thus fully described my invention, what I claim as new and desire to secure by Letters Patent, is:

1. A valve for a dispensing container having body and top portions sealed together, said valve comprising a pair of sheet metal members secured at their edges to the body portion, said members being spaced apart at the center to form a chamber, a washer contained within and supported on the bottom of said chamber, an opening in the washer, a hollow tube, open at the top and closed at the bottom, said tube having a press fit in said opening and being free to move in angular directions, apertures in the periphery of said tube at the position of said washer, a collar on the tube and resting on top of the washer within the chamber, said washer being distortionable by said collar along the opening in the washer to provide a space between the washer and dispensing tube when manual pressure is applied to the tube in an angular direction so as to bring the interior of the container into communication with said space and the peripheral openings in the tube.

2. A valve for a dispensing container having body and top portions sealed together by a rolled edge, a valve comprising a pair of sheet metal members secured at the rolled edge to the body portion, sealing material on at least one of said metal members at the rolled edge to provide an effective seal, said members being spaced apart at the center to form a chamber, a washer in said chamber, an opening in the washer, a hollow tube, open at the top and closed at the bottom, passing through said opening, said tube being free to move in angular directions, the upper sheet metal member being bent in a direction away from the lower sheet member at the center to form a second chamber of smaller size than the chamber which contains said washer, a collar on said tube positioned within said second chamber and resting on top of the washer, peripheral openings at the closed end of the tube at the position where the tube passes through the washer, whereby the openings are presented to the interior surface of the washer, said washer being distortionable by said collar along the opening in the washer to provide a space between the washer and dispensing tube when manual pressure is applied to the tube in an angular direction so as to bring the interior of the container into communication with said space and the peripheral openings in the tube.

3. A valve for a dispensing container having body and top portions sealed together at a rolled edge, said valve comprising a pair of sheet metal members shaped to a reentrant form and secured at their edges by the rolled joint, said metal members being provided with an outwardly extending bulge in the region of the rolled joint in order to increase the effectiveness of the seal, said members being spaced apart at the center of the container to form a chamber, a washer having flat upper and lower surfaces in said chamber, an opening in the washer, a hollow tube, open at the top and closed at the bottom, passing through said openings, said tube having a press fit in said opening and free to move in the lateral directions, the upper sheet metal member being pressed upwardly away from the adjacent compartment and away from the second sheet member to leave a chamber of smaller size than the chamber which contains the washer, an integral collar on said tube which is received by said second chamber, peripheral openings at the closed end of the tube at the position of the washer, said washer being distortionable by said collar along the opening in the washer to provide a space between the washer and dispensing tube when manual pressure is applied to the tube in an angular direction so as to bring the interior of the container into communication with said space and the peripheral openings in the tube.

4. A valve for a dispensing container having a rolled joint, said valve comprising a plurality of metal sheet members adapted to be secured to the container at the rolled joint, two of said members being spaced apart to form a chamber at the center of the container to receive an apertured rubber washer within the formed chamber, aligned openings in said members, a hollow dispensing tube extending through said washer and said members, the openings in said sheet metal members being larger than the dispensing tube, but the opening in said washer being smaller than the dispensing tube, said tube being closed at the bottom except for a plurality of openings in the periphery of the tube at the position of the washer, said tube being free to move in lateral directions, a collar on said tube and resting on top of the washer, said washer being distortionable by said collar along the opening in the washer to provide a space between the washer and dispensing tube when manual pressure is applied to the tube in an angular direction so as to bring the interior of the container into communication with said space and the peripheral openings in the tube.

References Cited in the file of this patent

UNITED STATES PATENTS

| | | |
|---|---|---|
| 1,869,049 | Card | July 26, 1932 |
| 2,565,954 | Dey | Aug. 28, 1951 |
| 2,612,293 | Michel | Sept. 30, 1952 |
| 2,621,014 | Efford | Dec. 9, 1952 |
| 2,631,814 | Abplanalp | Mar. 17, 1953 |
| 2,662,669 | Schmidt | Dec. 15, 1953 |
| 2,686,652 | Carlson et al. | Aug. 17, 1954 |